T. B. HARPER.
COMBINATION GARDEN IMPLEMENT.
APPLICATION FILED MAY 15, 1914.

1,181,003.

Patented Apr. 25, 1916.

2 SHEETS—SHEET 1.

Witnesses
Carvee Bailey
Wm. W. Downing

Inventor
Thomas B Harper,
By Richard B Owen.
Attorney

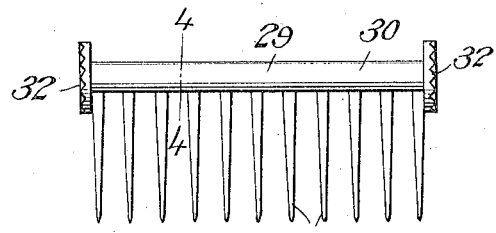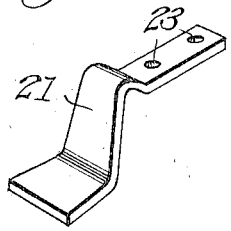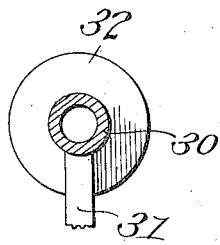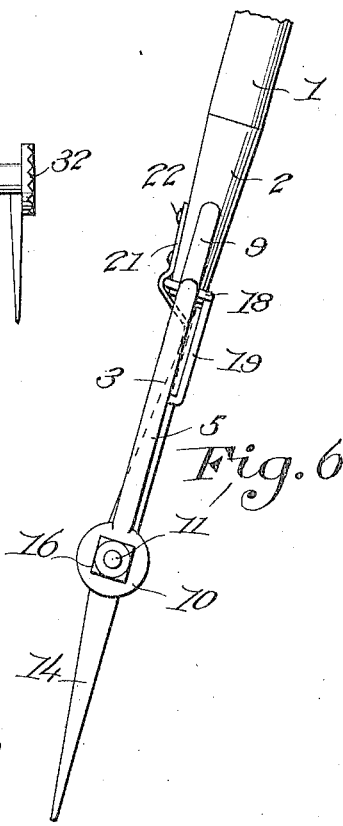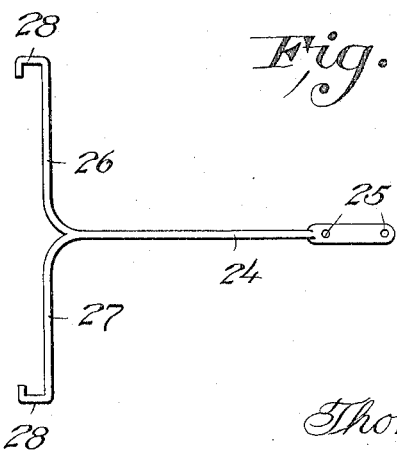

UNITED STATES PATENT OFFICE.

THOMAS B. HARPER, OF KINGSTREE, SOUTH CAROLINA.

COMBINATION GARDEN IMPLEMENT.

1,181,003.    Specification of Letters Patent.    Patented Apr. 25, 1916.

Application filed May 15, 1914. Serial No. 838,783.

*To all whom it may concern:*

Be it known that I, THOMAS B. HARPER, a citizen of the United States, residing at Kingstree, in the county of Williamsburg and State of South Carolina, have invented certain new and useful Improvements in Combination Garden Implements, of which the following is a specification.

My invention relates to implements and more particularly to a combination garden implement.

The primary object of my invention resides in the provision of an implement having means associated therewith for attaching various earth engaging elements.

Another object of my invention resides in the provision of a supporting means for a blade having means thereon for adjusting and holding the blade in a rigid position to act as either a shovel or a hoe.

A further object of my invention resides in the provision of an improved means for preventing movement of the supporting means and for clamping the blade into a position to form a shovel.

A still further object of my invention resides in the provision of an improved means carried by the handle for bracing and supporting the blade when using the blade as a hoe and when working in hard ground.

A still further object of my invention resides in the provision of an implement of the character described that is simple in construction, efficient in operation and one that can be manufactured and placed on the market at a minimum cost.

Other objects as well as the nature, characteristic features and scope of my invention will be more readily understood from the following description taken in connection with the accompanying drawings and pointed out in the claims forming a part of this specification.

Figure 1:
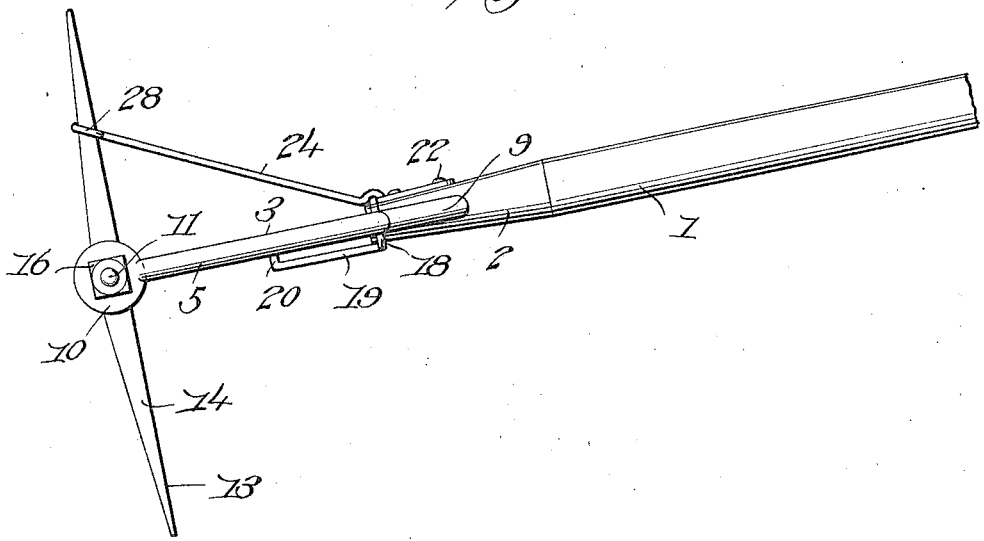
Figure 2:
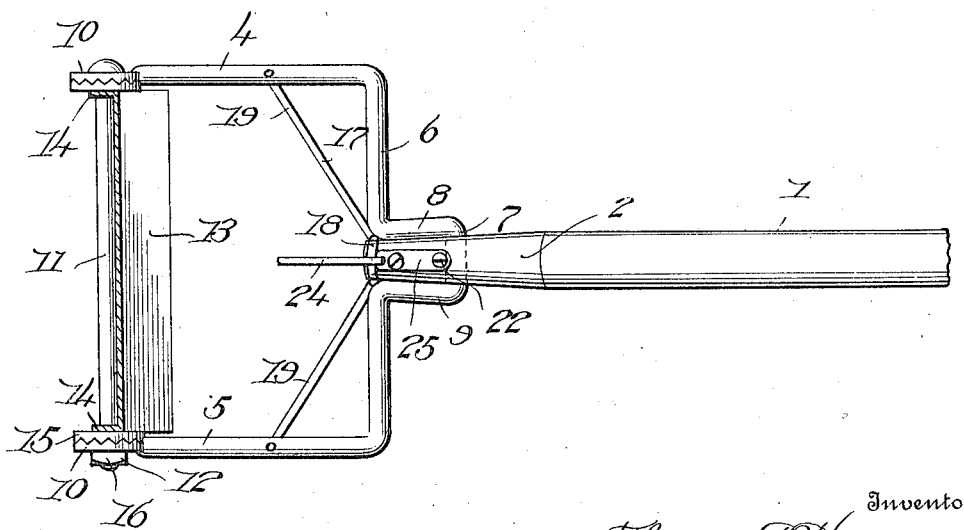

Referring to the drawings: Figure 1 is a side elevational view of my invention showing especially the blade used as a hoe having the bracing means associated therewith; Fig. 2 is a top plan view of the same showing the upper portion of the blade in section; Fig. 3 is a front elevational view of another of the ground engaging elements; Fig. 4 is an enlarged fragmentary sectional view taken on the line 4—4 of Fig. 3; Fig. 5 is a top plan view of the bracing means; Fig. 6 is a side elevational view showing especially the blade used in the capacity of a shovel and the clamping means associated therewith; and Fig. 7 is an enlarged perspective view of one of the clamping elements used for holding the blade as a shovel.

Referring more particularly to the drawings in which similar reference numerals designate corresponding parts throughout the different views, I provide a handle 1 having a ferrule 2 secured to the outer end thereof, the latter being provided with a transverse opening formed in the outer end thereof which has mounted therein my improved supporting frame 3 which in this instance consists essentially of a single piece of rod metal bent into a substantially U-shaped form and comprises supporting arms 4 and 5, the vertex 6 thereof being bent into a substantial U-shaped form at a point intermediate its ends, the vertex 7 of which is mounted within the opening in the ferrule and the arms 8 and 9 thereof arranged in close relation with the outer surface of the ferrule. The extreme outer ends of the supporting arms 4 and 5 are enlarged and flattened to provide oppositely disposed complemental serrated engaging disks 10 having alining openings therethrough for the reception of an elongated bolt 11, the latter being adapted for engagement with various earth engaging elements to be hereinafter described.

Pivotally mounted between the disks 10 by means of the bolt 11 is a blade 13 which in this instance has its side edges bent at right angles thereto to form flanges 14 which taper toward the outer edges of the blade and which blade is further provided on its opposite edges at points substantially intermediate its ends with serrated engaging disks 15, the latter being preferably formed integral with the blade and being complemental to and in engagement with the disks 12. In order to maintain the blade at various angles, I have screw-threaded a nut 16 on the free end of the bolt, the nut causing the serrated face on the disks 10 to engage the serrated faces of the disks 15 and thus prevent movement of the blade.

For the purpose of preventing movement to the supporting frame 3 and at the same time form a support for the blade when it is desired to use the same as a shovel, I have provided my improved stop member 17, which in this instance consists essentially of a ring 18 for engagement with the extreme outer end of the ferrule, the ring having extended from a portion thereof diverging arms 19, the free ends of which are bent at right angles to provide hook members 20 for engagement with the openings positioned in the arms 4 and 5 at points substantially intermediate their ends. It can be easily seen that the arms 19 constitute a support for the blade 13 when the blade is adjusted and arranged in parallel relation with the arms 4 and 5 and in order to further hold the blade in this position, I have provided a clamp member 21 and removably mounted the same by means of suitable fastening devices 22 on the outer surface adjacent the outer end of the ferrule. The clamp member 21 in this instance consists of a single strip of metal which is bent intermediate its ends, the free end portions thereof being arranged in parallel relation with each other, the upper of which being provided with openings 23 for engagement with the fastening devices and the opposite end portion being slightly diverged and adapted for engagement with the upper surface of the blade 13.

When it is desired to convert the blade into a hoe, the clamping member 21 is removed from the ferrule 2 and the blade 13 adjusted to the proper angle by means of the nut 16. In order to support the blade 16, especially when working in hard ground, I provide a bracing member 24 which in this instance consists essentially of a single piece of metal, one end of which is flattened and provided with openings 25 and which flattened end is secured to the ferrule by means of the fastening devices 22. The opposite end of the member is split to a point substantially intermediate its ends and the portions thereof bent in opposite directions and at right angles to the main portion thereof and constitute clamping arms 26 and 27, the free ends of which are bent upon themselves to form engaging hooks 28 for engagement with the oppositely disposed flanges 14 on the blade 13.

When it is desired to use this implement in the capacity of a rake either the clamping member 21 or the bracing member 24 is removed from the ferrule and the nut 16 unthreaded from the bolt to allow the latter to be disengaged from the blade, whereupon the rake head generally designated 29 is clamped therein. The rake head in this instance consists essentially of a tubular bar 30 having a plurality of teeth 31 depending therefrom in uniformly spaced relation, the bar being further provided on its outer edges about the opening therethrough with complemental serrated disks 32, the latter being similar in contour to the disks 10 and adapted for engagement therewith.

The operation of my device is as follows: Assuming that the blade 13 is detached from the supporting frame 3, when it is desired to use the blade in the capacity of a hoe, the disks 15 are placed into engagement with the disks 10 and the blade arranged at a proper angle, the bolt being then passed through and the blade rigidly secured in position by means of the adjusting nut 16 on the threaded end of the bolt. The bracing member 24 is now secured to the ferrule and the hook members 28 engaged upon the flanges of the blade for constituting a substantial auxiliary securing means when the same is in position, the arms 22 and 27 bearing against the face of the blade. In order to convert the blade into a shovel, the bracing member 24 is removed and the nut 16 loosened and the upper part of the blade is swung rearwardly until it engages the arms 19 whereupon the clamping member 21 is secured in position at the same point as the guarding member 24 was secured by means of the fastening devices 22. The arms 19 and the clamping element 21 serve as a suitable auxiliary clamp in the event that the weight be too heavy and take up great strains likely to be imparted to the blade. If it is desired to use the rake head, the blade 13 is removed by first unscrewing the head and the bolt 11 passed through the tubular bar 30 and the clamps 32 rigidly secured in position by means of the nut 16.

Although I have shown and described the preferred form of my invention, I desire to be understood that I am not limited to the exact details shown, the essential point being in the manner of converting the blade from a shovel to a hoe or vice-versa and the improved auxiliary supporting means associated with the blade and the handle.

From the above description taken in connection with the accompanying drawings it can easily be seen that I have provided a device that is simple in construction containing but a few simple parts that can be cheaply manufactured and assembled and when assembled can be placed upon the market and sold at a minimum cost.

It will be understood that the above description and accompanying drawings comprehend only the general and preferred embodiment of my invention and that various minor changes in detail of construction, proportion and arrangement of the parts may be made within the scope of the appended claims and without sacrificing any of the advantages of my invention.

Having thus fully described my invention, what I claim as new and desire to secure by Letters Patent, is:—

1. A garden implement including a handle, a supporting frame thereon, stop means carried by the handle and associated with the frame for preventing movement of the frame, an earth engaging blade adjustably carried by the frame, and means removably mounted on the handle and coöperatively associated with the earth engaging blade and stop means for supporting the blade when used as a shovel.

2. A garden implement including a handle, a supporting frame mounted thereon, stop means carried by said handle and in engagement with said frame for preventing movement of said frame, a tool blade, complemental serrated engaging disks carried by said frame and the side edges of said tool blade, fastening means passing through said disks for facilitating the angular adjustment of said tool, and means removably carried by the handle and coöperatively associated with said blade and said stop means for supporting said blade when used as a shovel.

3. A garden implement including a handle, a substantially U-shaped supporting frame mounted on one end thereof, serrated engaging disks formed on the outer ends of said frame, a tool blade, the longitudinal edges of said blade being bent to provide flanges, serrated engaging disks formed intermediate the ends of said flanges, a fastening bolt passing through said engaging disks and flanges, said bolt bracing said blade, a securing element removably associated with said bolt for clamping said blade in various positions with respect to said frame, and separate means removably carried by said handle and adapted to engage with said blade for holding the blade as a shovel or hoe.

4. A garden implement including a handle, a substantially U-shaped supporting frame mounted on one end thereof, a stop member including a ring and divergent arms mounted on said handle and associated with said frame for preventing movement of the frame, a tool blade adjustably clamped on said frame, and a clamping member removably carried by said handle for holding said blade in position against said stop member when the blade is used as a shovel.

In testimony whereof I affix my signature in presence of two witnesses.

THOMAS B. HARPER.

Witnesses:
F. W. HARPER,
L. A. ELLIOTT.